(12) United States Patent
Legaspi et al.

(10) Patent No.: US 8,925,568 B2
(45) Date of Patent: Jan. 6, 2015

(54) SYSTEMS AND METHODS FOR AUTOMATING THE OPERATION OF SOLENOID VALVES TO PREVENT OVERHEATING OF SOLENOID ELEMENTS

(76) Inventors: Ferdinand Villegas Legaspi, Chino, CA (US); Perfecto Ferrer Gallardo, Jr., Los Angeles, CA (US); Fernando Medina Bernardo, Chino, CA (US)

( * ) Notice: Subject to any disclaimer, the term of this patent is extended or adjusted under 35 U.S.C. 154(b) by 376 days.

(21) Appl. No.: 13/526,181

(22) Filed: Jun. 18, 2012

(65) Prior Publication Data
US 2012/0256110 A1    Oct. 11, 2012

Related U.S. Application Data

(63) Continuation-in-part of application No. 13/271,151, filed on Oct. 11, 2011, now abandoned.

(60) Provisional application No. 61/344,837, filed on Oct. 21, 2010.

(51) Int. Cl.
| | |
|---|---|
| *F16K 31/02* | (2006.01) |
| *H01F 7/124* | (2006.01) |
| *F16K 31/06* | (2006.01) |
| *H01F 7/16* | (2006.01) |
| *H01F 7/18* | (2006.01) |

(52) U.S. Cl.
CPC ............ *H01F 7/124* (2013.01); *F16K 31/0675* (2013.01); *H01F 7/1607* (2013.01); *H01F 7/1844* (2013.01)

USPC ................ 137/74; 137/75; 137/78.4; 137/80; 251/129.15; 251/90; 251/113

(58) Field of Classification Search
USPC .......... 251/90, 113, 129.15; 137/74, 75, 78.4, 137/78.5, 79, 80
See application file for complete search history.

(56) References Cited

U.S. PATENT DOCUMENTS

| | | | | |
|---|---|---|---|---|
| 875,264 | A * | 12/1907 | Hoelder et al. | 137/75 |
| 2,659,426 | A * | 11/1953 | Rowell | 137/75 |
| 5,275,194 | A * | 1/1994 | Gray, Jr. | 137/75 |
| 5,487,493 | A * | 1/1996 | McNabb | 251/90 |
| 5,694,970 | A * | 12/1997 | Staranchuk | 251/113 |
| 6,125,872 | A * | 10/2000 | Cunkelman et al. | 137/75 |
| 6,206,337 | B1 * | 3/2001 | Veillet, Jr. | 137/78.1 |
| 6,766,820 | B1 * | 7/2004 | Hoss | 137/66 |
| 6,820,633 | B2 * | 11/2004 | Liu | 137/74 |

* cited by examiner

*Primary Examiner* — Eric Keasel
(74) *Attorney, Agent, or Firm* — Heidi Eisenhut; Loza & Loza (57) ABSTRACT

Embodiments of the invention are directed to systems and methods for automating the operation of a solenoid valve to prevent overheating of solenoid elements. The solenoid valve controls the flow of a fluid, such as gas, and may be automatically interrupted, or shut-off, of power upon the occurrence of fluctuating currents or other events. Once the problem has been removed or repaired, the flow of fluid through the solenoid valve may resume.

20 Claims, 8 Drawing Sheets

SYSTEMS AND METHODS FOR AUTOMATING THE OPERATION OF SOLENOID VALVES TO PREVENT OVERHEATING OF SOLENOID ELEMENTS

CLAIM OF PRIORITY

This non-provisional United States (U.S.) Patent Application is a continuation-in-part application of, and claims priority on, non-provisional U.S. patent application Ser. No. 13/271,151 entitled "System and Methods of Solenoid Valve Automation to Open and Close Position", filed on Oct. 11, 2011, the contents of which is hereby incorporated by reference, which claims priority to U.S. Provisional Application No. 61/344,837 entitled "System and Methods of Solenoid Valve Automation to Open and Closed Position", filed Oct. 21, 2010, and hereby expressly incorporated by reference herein.

FIELD

The present invention relates to the field of automated safety capabilities for appliances or other devices, in particular, to systems and methods for interrupting the source of power supplied to a solenoid valve to prevent overheating of the solenoid elements.

BACKGROUND OF THE INVENTION

Solenoid valves are electromechanically operated valves that are commonly used in devices, such as appliances, to control liquid or the flow of gas from a gas supply. For example, most households have a gas stove, heater and/or dryer that utilize solenoid valves to control the flow of gas to these appliances. The valves use an electrical current (i.e. a source of energy/power) applied to a solenoid valve to create a magnetic field causing a plunger inside the coil to move. The plunger will either open or close the valve depending on the design of the valve. When electrical current is removed from the coil, the valve will return to its original, de-energized state.

When used with appliances, an electrical current is continually supplied to the valve allowing the valve to maintain either an open or closed position. However, continually supplying an electrical current to the valves can result in the solenoid valves receiving fluctuating currents which in turn can cause the valves to overheat. Overheating of the valves can result in the plunger being welded to the overheated coil which locks the valve to an open position. Having the valve in a constant open position can result in gas leaks which in turn can result in dangerous fires and explosions.

To avoid the overheating of solenoid valves caused by the continuous supply of an electrical current, the electrical current must be interrupted or shut-off from the source. However, current systems and methods fail to provide an automatic interruption, or shut-off, of power to the valve to prevent overheating of solenoid elements. Consequently, systems and methods for providing an automatic interruption, or shut-off, of power to prevent overheating of solenoid elements are needed.

SUMMARY

One feature of the present invention provides a solenoid valve is provided. The solenoid valve has a valve body having a fluid inlet port and fluid outlet port; a fluid inlet passage having a first inlet end and a second inlet end, the first inlet end connected to the fluid inlet port and the second inlet end terminating having a "Y" configuration with a first leg connected to an orifice and a second leg connected to a safety mechanism; a fluid outlet passage having a first outlet end and a second outlet end, the first outlet end connected to the outlet port and the second outlet end connected to the orifice; a plunger slidably disposed within the valve body and movable between a closed position, where the plunger engages the orifice to block the flow of fluid through the outlet fluid passage, and an open position, where the plunger is distanced from the orifice to permit the flow of fluid through outlet fluid passage; a first solenoid coil surrounding the plunger and a first spring connected to the plunger; and a second solenoid coil surrounding a second spring connected to a locking pin mechanism for holding the plunger in the first, open position.

Another feature of the present invention provides for a system for operating a solenoid valve. The system includes a remote control module for encoding a radio frequency (RF) signal for programming the valve to open and closed positions; a wireless receiver module for receiving and decoding the encoded signal from the remote control module; and a relay switch control module for interrupting power to the solenoid valve when activated by a command from the wireless receiver module, the command transmitted to the relay switch control module upon communication between a transmitter in the remote control module and a receiver in the wireless receiver module.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention. In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may not be shown detail in order not to obscure the embodiments.

Also, it is noted that the embodiments may be described as a process that is depicted as a flowchart, a flow diagram, a structure diagram, or a block diagram. Although the operations may be described as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

In the following description, certain terminology is used to describe certain features of one or more embodiments of the invention. The term "appliance" refers to any type of electrical and/or mechanical device which operates or runs on gas or other liquid, including, but not limited to, a stove, oven, fryer, barbeque, clothes dryer, water heater and furnace. The term "event" refers to any type of emergency or developing emergency including, but not limited to, fluctuating currents, a short circuit, a circuit overload and malfunctioning external device. The term "valve" refers to any type of valve device that regulates, directs or controls the flow of fluid, such as air, water or gas, by opening, closing, or partially obstructing various passageways.

Embodiments of the invention are directed to systems and methods for automating the operation of a solenoid valve to prevent overheating of solenoid elements. According to one embodiment, systems and methods having an automatic interruption, or shut-off, of power upon the occurrence of fluctuating currents or other events are provided. Once the problem has been removed or repaired, the flow of fluid may resume.

As discussed above, solenoid valves are electromechanically operated valves that are commonly used in devices, such as household appliances, to control fluid, such as the flow of gas from a gas supply. The valves use an electrical current (i.e. a source of energy/power) applied to a solenoid valve to create a magnetic field causing a plunger inside the coil(s) to move. The plunger will either open or close the valve depending on the design of the valve. When electrical current is removed from the coil, the valve will return to its original, de-energized state.

According to another embodiment, solenoid valves having a relay switch control module to cut-off or interrupt the power supply to the solenoids during the peak power distribution of control modules and relay switches is provided. The relay switch control module may include a self-charging capacitor to store and release energy and when the power source is down. The switches may be in a no contact (N.C.) position until triggered by a manual or wireless signal.

According to another embodiment, a solenoid valve that can be programmed remotely using a controlling interface for opening and closing the solenoid valve using Radio Frequency, Bluetooth or WiFi signal is provided.

According to another embodiment, a solenoid valve having a safety ball bearing attached to a spring inside a plastic chamber is provided. In the event of a fire, the extreme heat will melt the plastic chamber releasing the bearing and permanently block the valve orifice.

According to another embodiment, the solenoid valve may include valve adjustable knobs that can adjust the pushing power of the plunger to hold different pound per square inch (PSI). Valve adjustable knobs may include a spring that is connected to the plunger of the solenoid valve.

The flow of power (or energy) from a power source to a solenoid valve may be interrupted upon the detection of an event, such as a circuit overload or short circuit. Interrupting the flow of power may cause power to be cut off to the solenoid valve to prevent overheating of the solenoid elements.

According to another embodiment, a relay switch control module may include a timer for delaying the distribution of power to a relay which actuates the solenoid valve between an open and closed position. That is, the use of a timer allows the distribution of power to be delayed.

Solenoid Valve

Figure 1:
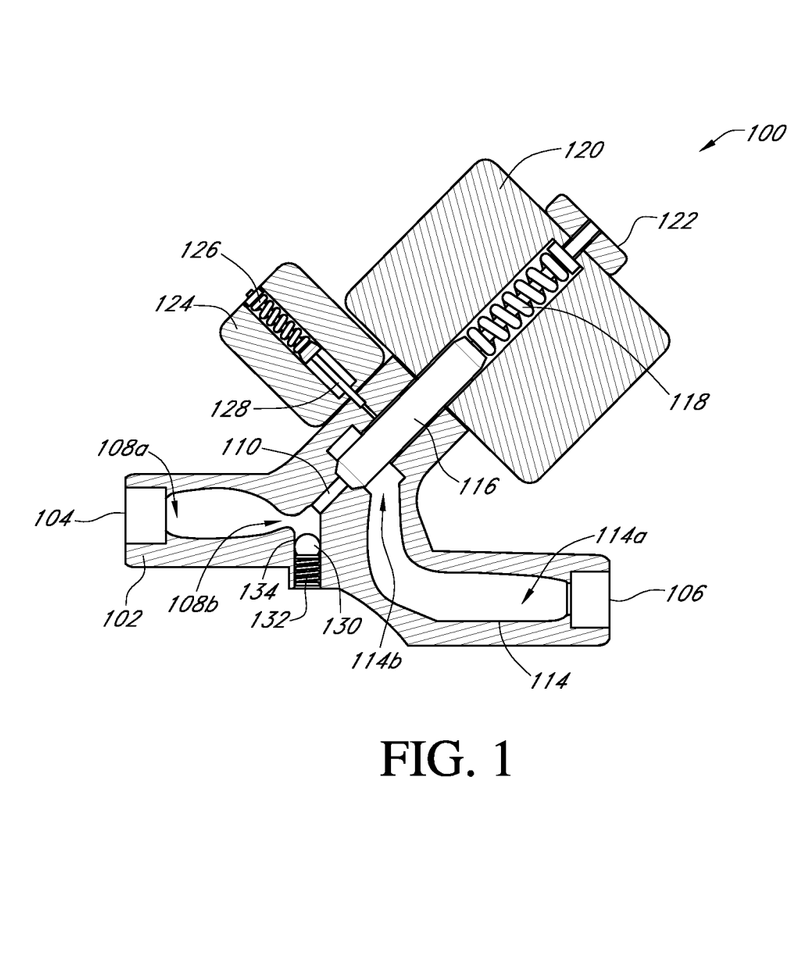
FIG. 1 illustrates a cross sectional view of a solenoid valve, according to one embodiment.

FIG. 1 illustrates a cross sectional view of a solenoid valve, according to one embodiment. As shown, the solenoid valve 100 may have a valve body 102 with a fluid inlet port 104 and a fluid outlet port 106. A fluid inlet passage 108 may be connected to the fluid inlet port 104 at a first end 108a and terminate in a second end 108b having a generally "Y" configuration. A first leg of the "Y" may be connected to an orifice 110 and a second leg of the "Y" may be connected to a safety mechanism 112, described in further detail below. A fluid outlet passage 114 may be connected to the outlet port 106 at a first end 114a and to the orifice 110 at a second end 114b.

A plunger 116 may be slidably disposed within the valve body 102 and movable between a closed position wherein the plunger 116 engages the orifice 110 to block the flow of fluid through the outlet fluid passage 114 and an open position wherein the plunger 114 is distanced from the orifice 110 to permit the flow of fluid through outlet fluid passage 114.

A first spring 118 presses the plunger tip against the opening of the orifice 110 The tip of the plunger may have a sealing material for preventing fluid from entering the orifice 110 until the plunger 116 is lifted up.

A first solenoid coil 120, connected to the valve body 102, may surround the plunger 116 and the first spring 118. The first solenoid coil 120 may be energized, by the application of an electrical current generating a magnetic field via a system relay control switch module, described in further detail below, to bias the plunger 116 between a first, open position and a second, closed position. An adjustable knob 122 may be connected to the first spring 118 for adjusting the force of the first spring 118. That is, the pound per square inch (PSI) of the spring may be adjusted.

A second solenoid coil 124, connected to the valve body 102, may surround a second spring 126 connected to a locking pin mechanism 128 for holding the plunger 116 in the first, open position. When the second solenoid coil 124 is un-energized, the spring remains in an expanded position pushing the pin locking mechanism 128 downward preventing the plunger 116 from moving into a closed position.

Conversely, when the second solenoid coil 124 is energized, by a charged capacitor in the system relay control switch module, described in further detail below, the second spring 126 contracts pulling the pin locking mechanism 128 upwards allowing the plunger 116 to move downwardly into the second, closed position closing the orifice 110. To keep the valve closed in the event that power is cut off, a relay in the system relay control switch module will collapse connecting its pole to the charged capacitor, releasing peak energy. The energized second solenoid coil 124 will pull-up the locking pin mechanism 128 that turns the plunger 116 to freely close the orifice 110.

Figure 2:
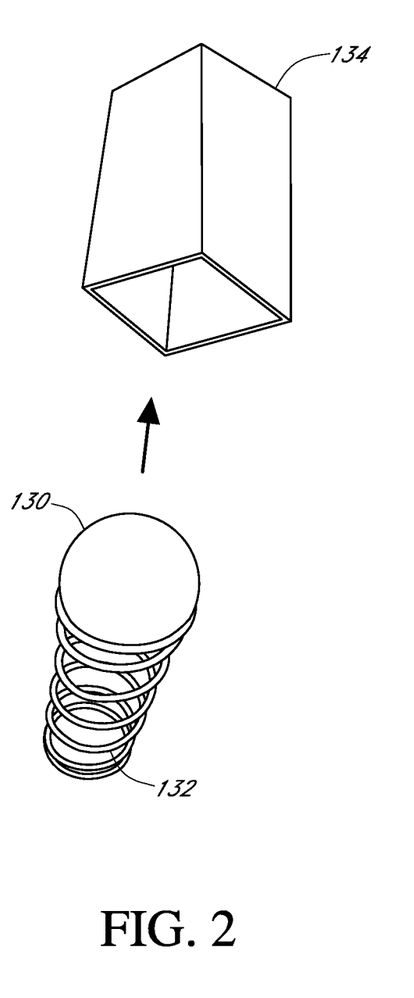
FIG. 2 illustrates an exploded view of the safety mechanism of FIG. 1.

If the inside of the solenoid valve 100 is exposed to extreme heat or fire, the safety mechanism 112 may be deployed. FIG. 2 illustrates an exploded view of the safety mechanism of FIG. 1. The safety mechanism 112 may be comprised of a ball bearing 130, attached to a spring 132, housed in a plastic chamber 134. When exposed to extreme heat or fire, the plastic chamber 134 will melt, releasing the ball bearing 130 allowing the spring 132 to push the ball bearing 130 into the fluid inlet port 104 permanently blocking the orifice 110 and preventing the flow of a liquid or gas through the valve.

Wireless Automated System for Controlling Solenoid Valve

Figure 3:
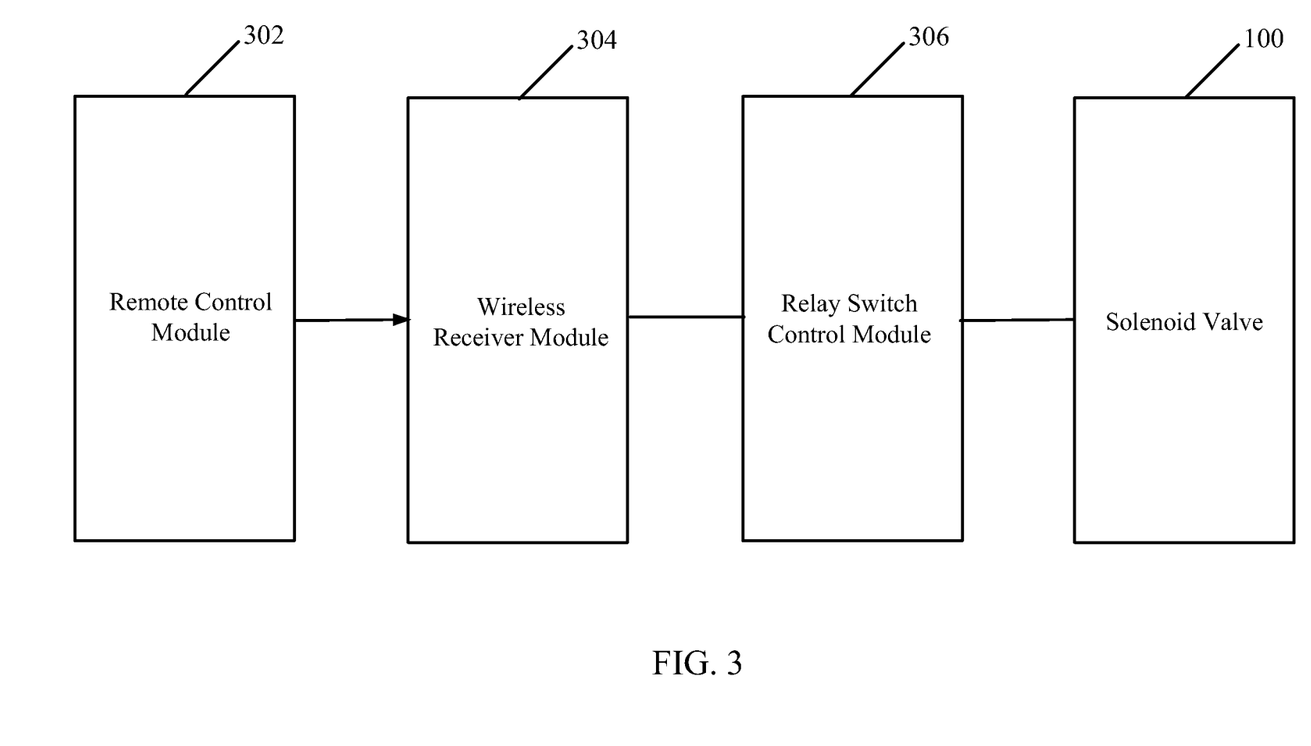
FIG. 3 is a block diagram illustrating a general overview of a system and method for wirelessly controlling the operation of a solenoid, according to one embodiment.

FIG. 3 is a block diagram illustrating a general overview of a system and method for wirelessly controlling the operation of a solenoid valve, according to one embodiment. To operate the valve (i.e. remotely open and close the orifice of the valve), the system may utilize a remote control module 302 for encoding a radio frequency (RF) signal for programming the valve to an open or closed position. The remote control module 302 may be activated by a command initiated through a source device, such as a smoke alarm, fire alarm, carbon monoxide detector, etc. For example, the sound of a smoke alarm going off may activate the remote control module 302.

The encoded RF signal may be transmitted from the remote control module 302 to a wireless receiver module 304 operating at the same frequency. The wireless receiver module 304 receives and decodes the encoded RF signal. The decoded RF signal may be used to instruct and control an alarm module and provide commands to a relay switch control module 306 which is connected to the solenoid valve 100 which is operable between an open position and a closed position. The alarm module may provide an audible alert indicating that there has been a communication between a transmitter in the remote control module 302 and a receiver in the wireless receiver module 304 and that the relay switch control module 306 has been activated. That is, the alarm module may provide notification via an audible alert or via a light that an event or emergency has been detected and that the valve has been shut off preventing the flow of a fluid, such as gas.

As described above, when the solenoid valve 100 is in an open position, a lock pin mechanism within the solenoid valve 100 may hold a plunger in an open position. Conversely, when the solenoid valve 100 is in a closed position, even when no power is being supplied to the solenoid valve 100, a charged capacitor within the relay switch control module 306 may automatically be activated to discharge its stored energy to lock and close the orifice.

Manual System for Controlling Solenoid Valve

Figure 4:
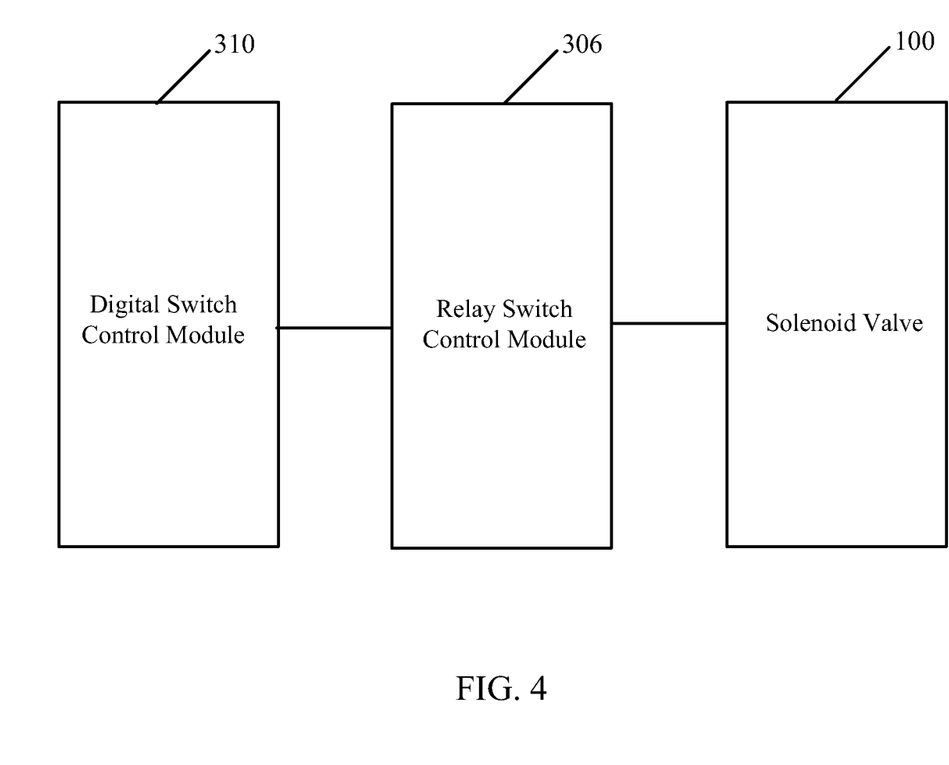
FIG. 4 is a block diagram illustrating a general overview of a wired system and method for controlling the operation of a solenoid valve, according to one embodiment.

FIG. 4 is a block diagram illustrating a general overview of a wired system and method for controlling the operation of a solenoid valve, according to one embodiment. As shown a digital control switch module 310 may operate as a main controller to program the solenoid valve 100 between open and closed positions. According to one embodiment, the digital switch control module 310 can set the solenoid valve 100 to an open position when the relay switch control module 306 is programmed to an open position. When the digital switch control module 310 sets the solenoid valve 100 to a closed position, even when power supply is down, a self-charging capacitor in the relay switch control module 306, as described below in further detail, can automatically activate to discharge peak energy to lock and close the orifice 110 of the solenoid valve 100. The digital control switch module 310, relay switch control module 306 and solenoid valve 100 may be hardwired together.

Remote Control Module

Figure 5:
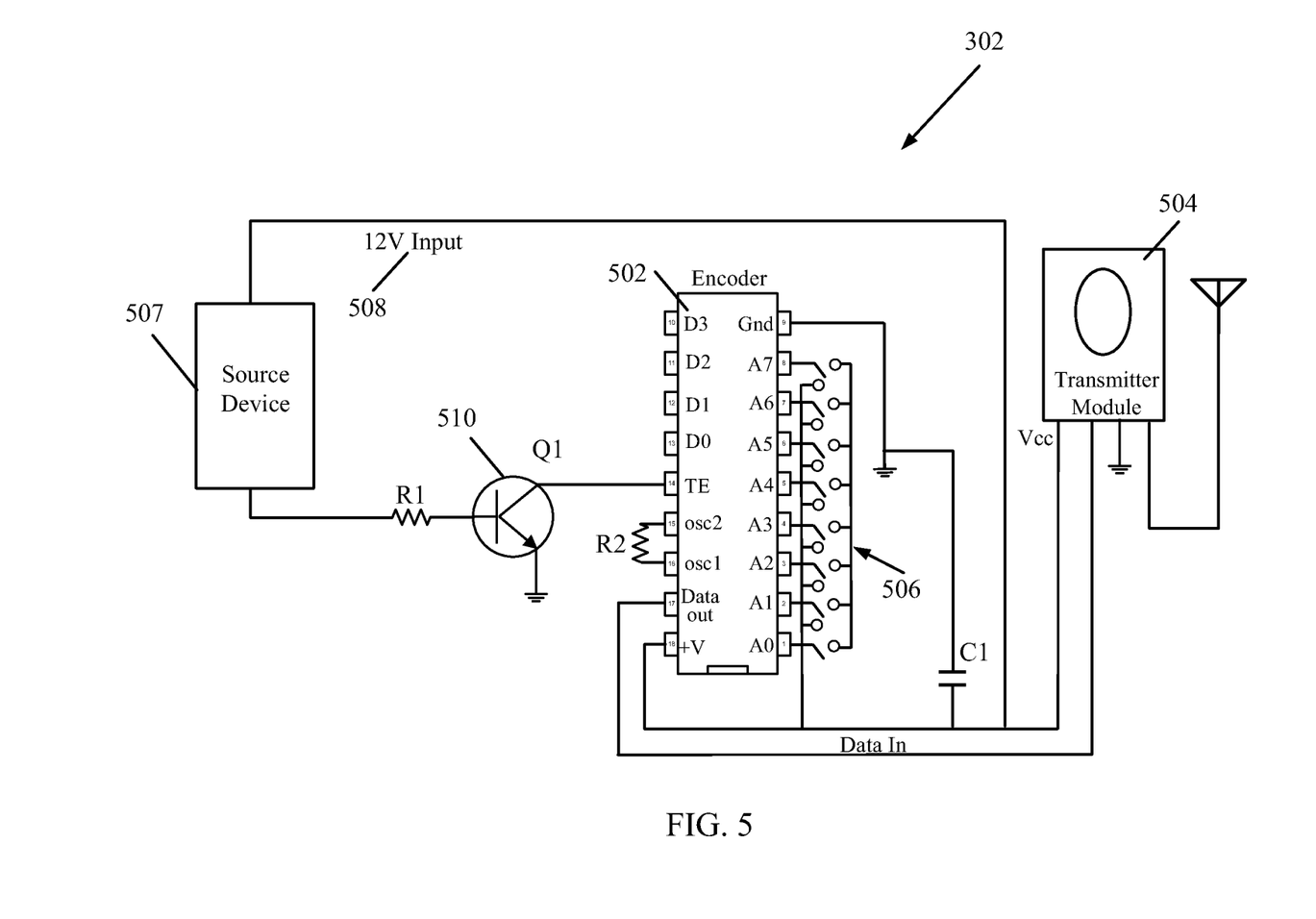
FIG. 5 is a schematic diagram of the remote control module of FIG. 3.

FIG. 5 is a schematic diagram of the remote control module 302 of FIG. 3. The remote control module 302 may be used to set the solenoid valve 100 to an open or closed position. As shown, the remote control module 302 may include an encoder 502 for signaling a transmitter module 504 to communicate with the wireless receiver module 304. The encoder 502 may encode an eight bit (8) number received via pins 1-8 (A0-A7). A plurality of plurality of switches 506 may also be connected to pins 1-8 (A0-A7) of the encoder 502 for programming the frequency of the encoder 502 to correspond with the frequency of a particular source device so that the source device can communication with the remote control module 302. For example, a first frequency may be used to communicate with a first source device, such as a smoke alarm, and a second frequency may be used to communication with a second source device, such as a fire alarm. As the first and second source devices are different, each may operate at a different frequency.

Power may be supplied to the encoder 502 by way of a source device 507. According to one embodiment, the encoder 502 may be supplied with 12VDC 508 from the source device 507. The source device 507 may be, for example, a smoke sensor, thermal detector, phone unit, computer or other device. The source device 507 may be connected to the base of a NPN transmitter 510 (Q1) via a resistor R1. The collector of the NPN transmitter 510 may be connected to the transmit enable (TE) pin of the encoder 502 while the emitter of the NPN transmitter 510 may be connected to ground. To activate the remote control module 302, the source device 507 may initiate a command by sending a signal to the base of the NPN transmitter 510. For example, if a smoke sensor detects smoke, a signal (for example a sound signal) may be sent to the TE pin of the encoder 502 enabling the encoder 502 which in turn activates the remote control module 302. Once activated, the encoded signal may be sent from the data out pin of the encoder 502 to the transmitter module 504 for transmission to the wireless receiver module 304.

A resistor R2 may be connected between the osc1 pin and the osc2 pin of the encoder 502. The value of R2 may be used to determine the oscillator frequency of the encoder 502. A capacitor C1 may be connected between the power and ground lines to isolate the positive (+) and negative (−) lines for reducing the distribution of frequency from ground. As a result, the strength of the frequency may be increased to deliver the signal (i.e. the encoded signal) to the wireless receiver module 304.

Wireless Receiver Module

Figure 6:
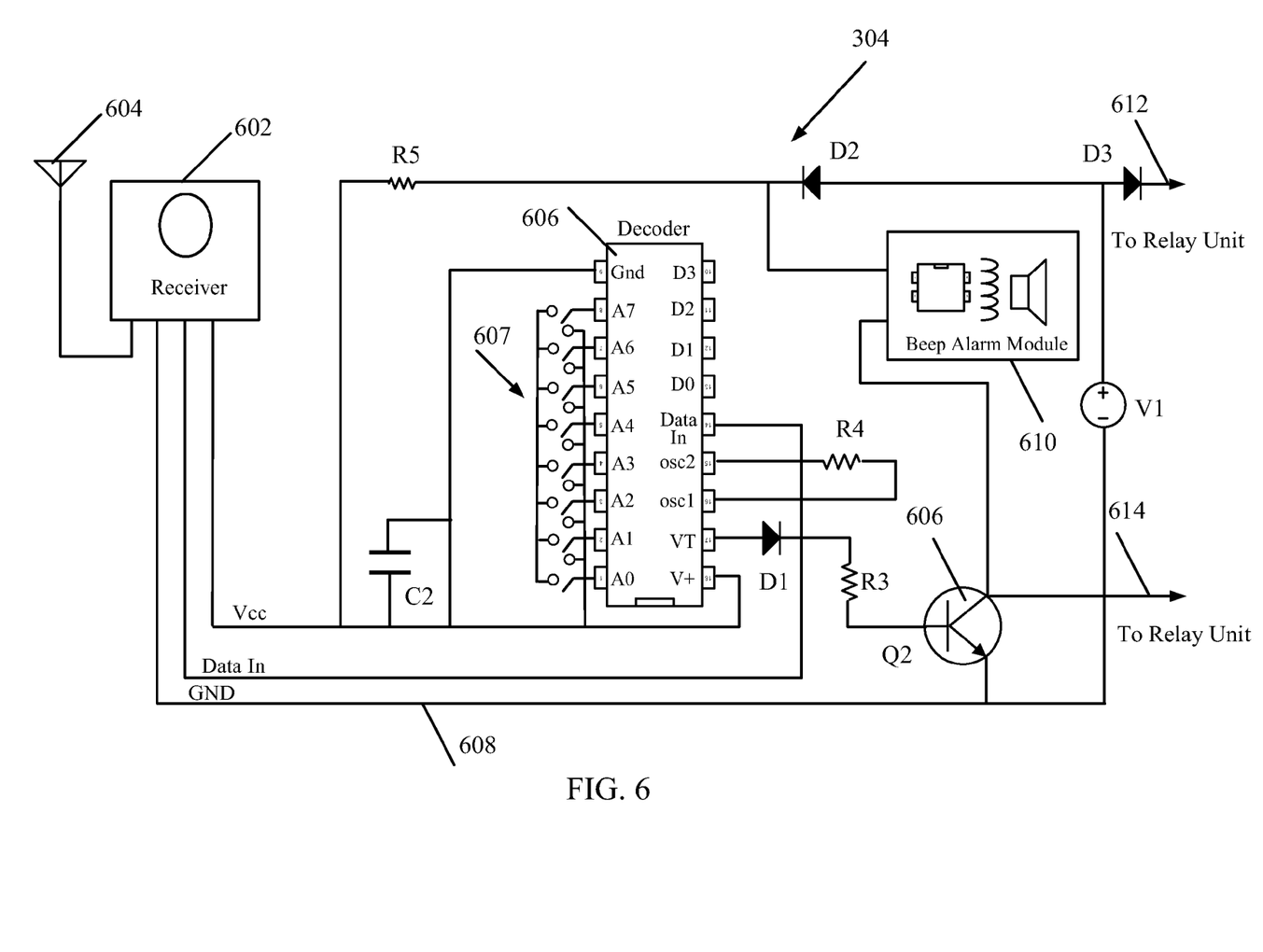
FIG. 6 is a schematic diagram of the wireless receiver module of FIG. 3

FIG. 6 is a schematic diagram of the wireless receiver module 304 of FIG. 3. As shown, a receiver 602 may be configured to receive signals, such as radio-frequency (RF) signals, via a wireless antenna 604. In one embodiment, the receiver may receive encoded signals transmitted from the transmitter module 504 of the remote control module 302. Once received, the encoded signal may be sent to the data-in pin of a decoder 606. The supply voltage (V+) pin and ground (Gnd) pin of the decoder 606 may be connected to Vcc and GND of the receiver 602 for powering the decoder 606.

As with the encoder 502 of FIG. 5, the decoder 606 may include a plurality of switches 607 connected to pins 1-8 (A0-A7). The plurality of switches 607 may be used to program the frequency of the decoder 606 to correspond/match the frequency of the encoder 502. If the frequencies match, the decoder receives and decodes the encoded signal and in turn sets the verify transmission (VT) pin on the decoder 606 to high. When the VT pin is set to high, a NPN transistor (Q2) 606, connected to the VT pin of the decoder via a diode D1 and a resistor R3, is turned on. Powering on the NPN transistor 606 may cause the ground terminal 608 to be turned on which in turn activates an alarm module 610 and provides power to a first signal line 612 and a second signal line 614 of the relay control switch module 306. As discussed above, the alarm module 610 may provide an audible alert indicating that there has been a communication between a transmitter in the remote control module 302 and a receiver in the wireless receiver module 304 and that the relay switch control module 306 has been activated.

A resistor R4 may be connected between the osc1 pin and the osc2 pin of the decoder 606. The value of R4 may be used to determine the oscillator frequency of the decoder 606. As with the encoder 502, a capacitor C2 may be connected between the power and ground lines to isolate the positive (+) and negative (−) lines for reducing the distribution of frequency from ground. As a result, the strength of the frequency may be increased to deliver the signal (i.e. the decoded signal).

Additionally, a resistor R5 may be connected between Vcc of the receiver 602 and the beep alarm module 610. A pair of diodes D2, D3, connected in parallel, may be connected between the beep alarm module 610/resistor R5 and a voltage source V1. The (−) line of V1 may be connected to GND of the receiver 602 while the (+) line of V1 may be connected to Vcc of the receiver 602, via R5, D2 and D3.

Relay Control Switch Module

Figure 7:
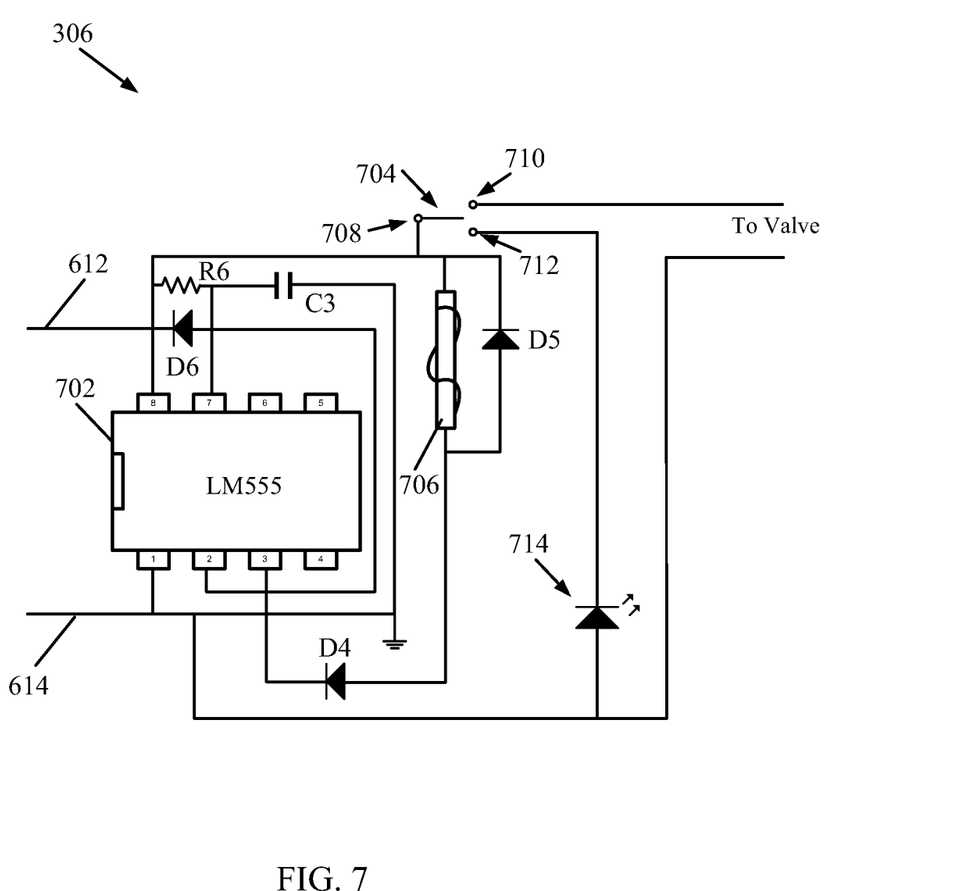
FIG. 7 is a schematic diagram of the relay control switch module of FIG. 3.

FIG. 7 is a schematic diagram of the relay control switch module 306 of FIG. 3. The first and second signal lines 612, 614 may be connected to, and deliver power to, a timer 702, such as a LM555, for delaying the distribution of power to a single pole, double throw (SPDT) switch 704, operable between a first position and a second position. According to one embodiment, power may be delayed for one (1) second. Delaying the distribution of power to the SPDT switch 704 protects the valve 100 from too much power as time is needed for the power to be in a stable position before the power is distributed.

A magnetic coil 706 may cause the switch 704 to actuate between the first position and the second position as well as from the second position to the first position when energized.

A relay pole 708 of the switch 704 may directly supply the positive source to a first pole 710, which is positioned to the positive line of the valve, and a second pole 712 is positioned to the negative terminal of the valve. After the 1 second delay described above, the relay pole 710 may switch connection to the second pole 712 which causes an LED 714 to be turned on indicating that the valve has been shut-off. The 1 second delay may also protect the LED from receiving too much power and burning out.

As described previously, the relay switch control module 306 may cut-off or interrupt the power supply to the solenoids in solenoid valves during the peak power distribution of the control modules and relay switches. The relay switch control module 306 may include a self-charging capacitor C3 to store and release energy and when the power source is down. The self-charging capacitor can automatically activate to discharge peak energy to lock and close the orifice 110 of the solenoid valve 100. The switch 704 may be in a no contact (N.C.) position until triggered by a manual or wireless signal. As described previously, a charged capacitor in the relay control switch module 308 may energize the second solenoid coil 124 of the solenoid valve 100 causing the second spring 126 to contract and pull the pin locking mechanism 128 upwards allowing the plunger 116 to move downwardly into the second, closed position closing the orifice 110. To keep the valve closed in the event that power is cut off, a relay in the system relay control switch module will collapse connecting its pole to the charged capacitor, releasing peak energy. The energized second solenoid coil 124 will pull-up the locking pin mechanism 128 that turns the plunger 116 to freely close the orifice 110.

A diode D4 may be connected between the timer and the magnetic coil, a diode D5 may be connected in parallel with the magnetic coil 706 and a diode D6 may be connected between the timer 702 and the first signal line 612.

A resistor R6 may be connected to the charging capacitor C3, timer 702 and magnetic coil 706.

Digital Switch Control Module

Figure 8:
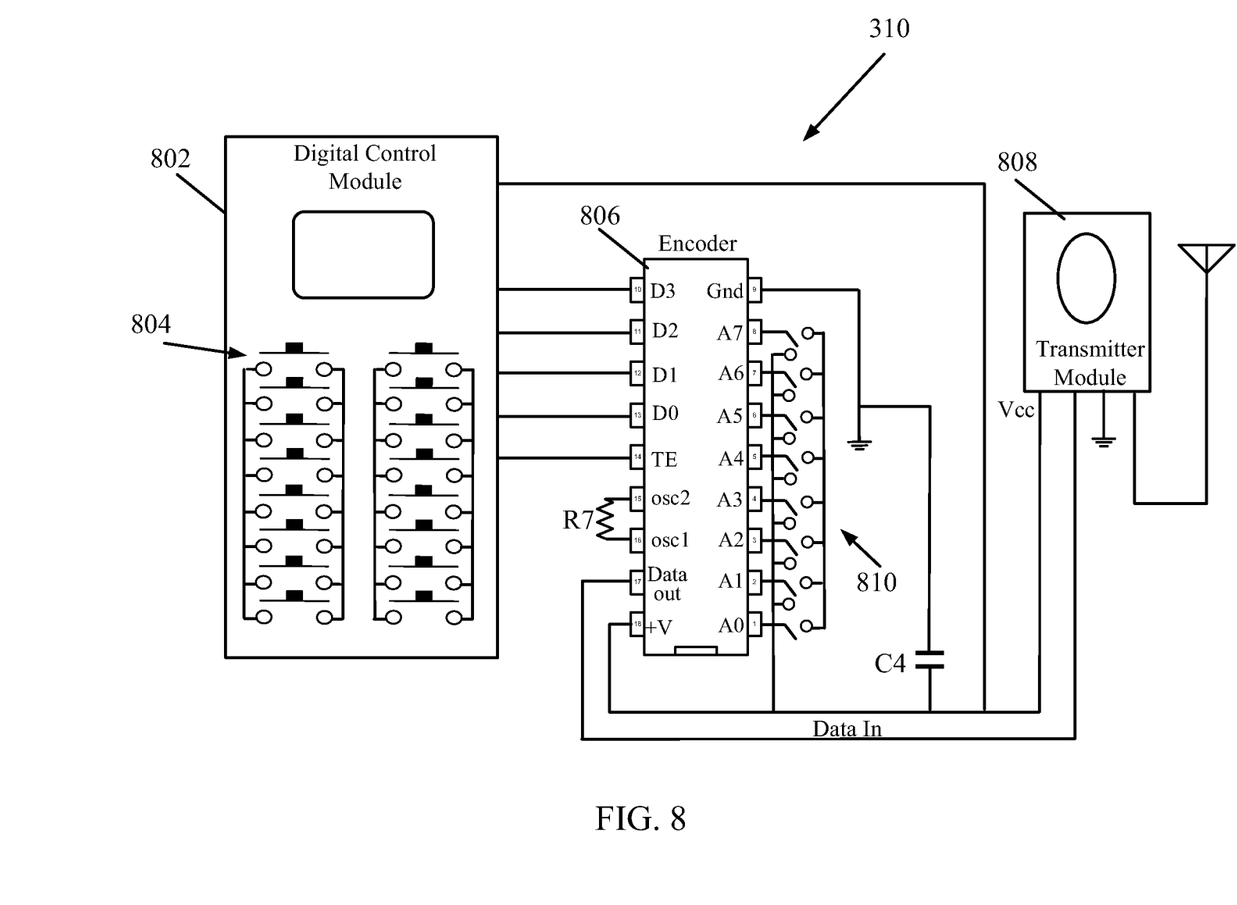
FIG. 8 is a schematic diagram of the digital switch control module of FIG. 4.

FIG. 8 is a schematic diagram of the digital switch control module 310 of FIG. 4. The digital switch control module 310 may be a main controller to program the solenoid valve 100 between open and closed positions. As described above, the digital switch control module 310 may be wired to the relay switch control module 306 allowing the solenoid valve 100 to be operated manually.

As shown, the digital switch control module 310 may include a digital control module 802 which may be used to program the frequency of an encoder 806, via a plurality of push buttons 804. The encoder 806 may encode an eight bit (8) number received via pins 1-8 (A0-A7). A plurality of switches 810 may also be connected to the digital control module 802 and pins 1-8 (A0-A7) of the encoder 806 for programming the frequency of the encoder 806 to correspond with a particular source device. For example, a first frequency may be used to communicate with a first source device, such as a smoke alarm, and a second frequency may be used to communicate with a second source device, such as a fire alarm. As the first and second source devices are different, each may operate at a different frequency.

The encoder 806 may signal a transmitter module 808 to communicate with the relay switch control module 306. The transmitter module 808 may transmit data from the encoder 806 which receives a command from the source device or the digital control module 802 to transmit the data.

According to one embodiment, the encoder 806 in the digital switch control module 310 may also be used to communicate with the wireless receiver module 304 of FIG. 6 to control one or more valves wirelessly connected to the relay switch control module 306. That is, the frequency of the encoder 806 is programmed to correspond/match the frequency of the wireless receiver module 304.

Power may be supplied to the encoder 806 via the digital control module 802. The digital control module 802 may also be connected to data pins D0-D3 of the encoder 806. The transmit enable (TE) pin of the encoder 806 may be connected to the digital control module 802. The distribution of addressed signals to the transmitter module 808 may be linked directly with the encoder 806, the operation of which may be controlled by a timed switch located in the digital control module 802, and as a result may keep the valve in an open or closed position. The addressed signal may then be sent from the transmitter module 808 to the relay switch control module 306 which is connected to the solenoid valve.

The digital control module 802, using the plurality of push buttons 804, may be used to program the valve to either an open or closed position, set the time (in hours, minutes and seconds) in which to open and close the valve, program a password to limit access to the system, adjust the volume of the beep or alarm, set up an operating sequence to more than one valve (i.e. the digital control module may control two or more valves) and receive a WiFi or BlueTooth signal and convert the signal to a RF signal. As described above, the data from the plurality of push buttons 804 is received in the data line (D0-D3) of the encoder 806.

A resistor R7 may be connected between the osc1 pin and the osc2 pin of the encoder 806. The value of R7 may be used to determine the oscillator frequency of the encoder 806. A capacitor C4 may be connected between the power and ground lines to isolate the positive (+) and negative (−) lines for reducing the distribution of frequency from ground. As a result, the strength of the frequency may be increased to deliver the signal (i.e. the encoded signal).

One or more of the components and functions illustrated in FIGS. 1-8 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A solenoid valve comprising:
a valve body having a fluid inlet port and fluid outlet port;
a fluid inlet passage having a first inlet end and a second inlet end, the first inlet end connected to the fluid inlet port and the second inlet end terminating having a "Y" configuration with a first leg connected to an orifice and a second leg connected to a safety mechanism;
a fluid outlet passage having a first outlet end and a second outlet end, the first outlet end connected to the outlet port and the second outlet end connected to the orifice;
a plunger slidably disposed within the valve body and movable between a closed position, where the plunger engages the orifice to block the flow of fluid through the outlet fluid passage, and an open position, where the plunger is distanced from the orifice to permit the flow of fluid through outlet fluid passage;
a first solenoid coil surrounding the plunger and a first spring connected to the plunger; and
a second solenoid coil surrounding a second spring connected to a locking pin mechanism for holding the plunger in the first, open position.

2. The solenoid valve of claim 1, wherein the first solenoid coil is energized by application of an electrical current generating a magnetic field to bias the plunger between a first, open position and a second, closed position.

3. The solenoid valve of claim 1, wherein when the second solenoid coil is un-energized, the second spring remains in an expanded position pushing the pin locking mechanism downward preventing the plunger from moving into a closed position.

4. The solenoid valve of claim 1, wherein when the second solenoid coil is energized, the second spring contracts pulling up the pin locking mechanism upwards allowing the plunger to move downwardly into the second, closed position closing the orifice.

5. The solenoid valve of claim 1, wherein the first spring presses a tip of the plunger against the opening of the orifice, the tip of the plunger having a sealing material for preventing fluid from entering the orifice until the plunger is lifted up.

6. The solenoid valve of claim 1, further comprising an adjustable knob connected to the first spring for adjusting the force of the first spring.

7. The solenoid valve of claim 1, wherein the safety mechanism includes a ball bearing, attached to a third spring, housed in a plastic chamber.

8. The solenoid valve of claim 7, wherein the plastic chamber melts upon exposure to extreme heat or fire releasing the ball bearing and allowing the spring to push the ball bearing into the fluid inlet port permanently blocking the orifice.

9. The solenoid valve of claim 1, wherein a remote control module encodes a radio frequency (RF) signal for programming the valve to the open and closed positions and transmits the encoded signal to a wireless receiver module, the remote control module provides commands to a relay switch control module in communication with the solenoid valve.

10. The solenoid valve of claim 9, wherein relay switch control module interrupts power to the solenoid valve upon the detection of an event by a source device, the source device in communication with the remote control module; and wherein the event includes at least one of a short circuit, a circuit overload, fire and a malfunctioning external device.

11. The solenoid valve of claim 9, wherein the remote control module is activated by a command initiated through the source device.

12. The solenoid valve of claim 9, wherein the source device is a smoke detector or a thermal detector.

13. The solenoid valve of claim 9, wherein the relay switch control module includes a self-charging capacitor which is automatically activated to discharge peak energy to lock and close the orifice.

14. The solenoid valve of claim 1, wherein operation of the solenoid valve is controlled via a digital control switch module, the digital control switch module wired to a relay switch control module wired to the solenoid valve.

15. The solenoid valve of claim 14, wherein the digital control switch module operates as a main controller to program the solenoid valve between the open and closed positions.

16. The solenoid valve of claim 15, wherein when the digital switch control module sets the solenoid valve to a closed position, a self-charging capacitor in the relay switch control module is automatically activate to discharge peak energy to lock and close the orifice.

17. A solenoid valve comprising:
a valve body having a fluid inlet port and fluid outlet port;
a fluid inlet passage having a first inlet end and a second inlet end, the first inlet end connected to the fluid inlet port and the second inlet end terminating having a "Y" configuration with a first leg connected to an orifice and a second leg connected to a safety mechanism;
a fluid outlet passage having a first outlet end and a second outlet end, the first outlet end connected to the outlet port and the second outlet end connected to the orifice;
a plunger slidably disposed within the valve body and movable between a closed position, where the plunger engages the orifice to block the flow of fluid through the outlet fluid passage, and an open position, where the plunger is distanced from the orifice to permit the flow of fluid through outlet fluid passage;

a first solenoid coil surrounding the plunger and a first spring connected to the plunger;

a second solenoid coil surrounding a second spring connected to a locking pin mechanism for holding the plunger in the first, open position; and an adjustable knob connected to the first spring for adjusting the force of the first spring.

18. The solenoid valve of claim 17, wherein the safety mechanism includes a ball bearing, attached to a third spring, housed in a plastic chamber.

19. The solenoid valve of claim 18, wherein the plastic chamber melts upon exposure to extreme heat or fire releasing the ball bearing and allowing the spring to push the ball bearing into the fluid inlet port permanently blocking the orifice.

20. The solenoid valve of claim 17, wherein a remote control module encodes a radio frequency (RF) signal for programming the valve to the open and closed positions and transmits the encoded signal to a wireless receiver module, the remote control module provides commands to a relay switch control module in communication with the solenoid valve;

wherein relay switch control module interrupts power to the solenoid valve upon the detection of an event by a source device, the source device in communication with the remote control module;

wherein the event includes at least one of a short circuit, a circuit overload, fire and a malfunctioning external device; and wherein the remote control module is activated by a command initiated through the source device.

* * * * *